United States Patent [19]
Uno

[11] 3,860,939
[45] Jan. 14, 1975

[54] WIND-UP INTERLOCK FOR A SINGLE LENS REFLEX CAMERA

[75] Inventor: Naoyuki Uno, Saitama-ken, Japan

[73] Assignee: Asahi Kogaku Kogyo Kabushiki Kaisha, Tokyo-to, Japan

[22] Filed: Sept. 19, 1973

[21] Appl. No.: 398,697

[30] Foreign Application Priority Data
Sept. 22, 1972  Japan.............................. 47-110288

[52] U.S. Cl................................. 354/153, 354/206
[51] Int. Cl. .......................................... G03b 17/42
[58] Field of Search ........... 354/153, 205, 206, 152; 95/42

[56] References Cited
UNITED STATES PATENTS
| | | | |
|---|---|---|---|
| 3,012,490 | 12/1961 | Takahama | 354/205 |
| 3,447,440 | 6/1969 | Ettischer | 354/153 |
| 3,653,312 | 4/1972 | Kondo | 354/153 |

*Primary Examiner*—Samuel S. Matthews
*Assistant Examiner*—E. M. O'Connor
*Attorney, Agent, or Firm*—Christie, Parker & Hale

[57] ABSTRACT

Apparatus in a single lens reflex camera interlocks its film winding mechanism so that the film cannot be advanced while movable members in the camera are in their picture-taking positions, the movable members including the mirror which temporarily pivots up to its picture taking position where it is out of the way of the film during frame exposure and pivots back after closure of the shutter to its picture-composing position where it reflects light for viewing through the viewfinder. The interlock apparatus includes a driving member for the movable members in the camera, and a multiposition member interlocked with the film winding mechanism for releasably engaging the multiposition member.

5 Claims, 4 Drawing Figures

3,860,939

WIND-UP INTERLOCK FOR A SINGLE LENS REFLEX CAMERA

BACKGROUND OF THE INVENTION

This invention relates to single lens reflex cameras.

In a conventional single lens reflex camera, the film winding mechanism can be operated to advance the film immediately after the shutter button has been depressed. It is possible, therefore, for the film to be advanced while a picture-taking operation is in progress. This is particularly troublesome in cases where prolonged exposure times are used. In some of the earlier cameras there was provided a mechanical governor that the photographer could use to control the picture taking operation. These governors were noisy and for that reason the photographer would generally know when the picture-taking operation ended, and, accordingly, would not likely operate too early the film winding mechanism by inadvertence. However, with the more modern cameras which have the so-called electronic shutter, there is no such incident noise, and such inadvertence is more likely.

A related problem arises in connection with a conventional single lens reflex camera, when used in combination with a motor drive. The concern here is that the motor drive in starting a wind-up operation, immediately after actuation of the shutter may cause, owing to the time delay incident to the mirror action, such abnormal actions as winding-up before full engagement of the mirror, or winding up in the course of swinging the mirror up.

SUMMARY OF THE INVENTION

The present invention is directed to overcoming the foregoing problems. According to this invention there is provided an interlock making it impossible to advance the film unless a full cycle of shutter action is complete.

The invention is embodied in a single lens reflex camera having a winding mechanism that is wound-up in preparation for a picture-taking operation and is thereafter interlocked against rewinding until the picture-taking operation is complete. Movable actuating members in the camera each have a picture-composing position and a picture-taking position. A driving member is in a mechanical arrangement that causes the actuating members to move through these positions in a cycle during the course of a picture taking operation. A multi-position member also moves through a cycle during the picture-taking operation. In its cycle the multi-position member moves from a first position in which it engages the driving member to a second position at which it is temporarily retained by the driving member. Means connected to the multi-position member provide for interlocking the film winding mechanism while the multi-position member is in the second position. Advantageously, the interlocking means includes cooperating stops on a cam associated with the film winding mechanism and an engaging lever that is pivotally moved into engagement therewith by a linkage driven by the multi-position member.

DETAILED DESCRIPTION

Figure 1:
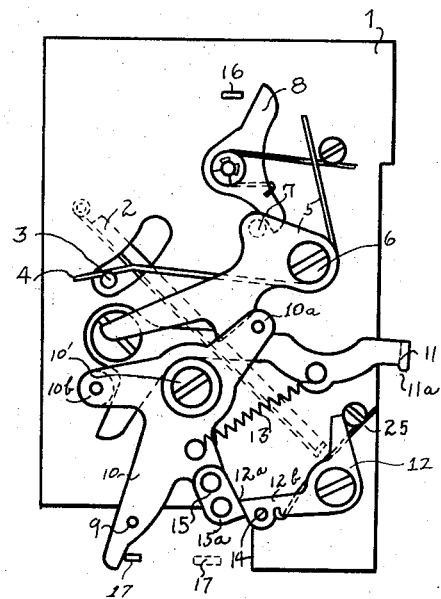
FIG. 1 is a side elevation view of a mirror box of a single lens reflex camera embodying this invention, and illustrates a condition wherein the co-operating parts are in a picture-composing position.

In the drawings there is shown a mirror box 1 that is housed within a single lens reflex camera (not shown). As is conventional, the camera has a shutter mechanism (not shown) that is opened and then closed during a picture-taking operation. Also as is conventional, the camera has a film winding mechanism, described in more detail below, for advancing film into position to be exposed. The film is advanced prior to the picture-taking operation which begins upon depression of a shutter button (not shown) and ends upon or a short time after closure of the shutter.

A mirror 2 is partly visible in FIG. 1 through an arcuate slot in the mirror box 1, the rest of the mirror being shown in dashed lines. On the mirror holding frame there is fixed a mirror actuating pin 3 that projects through the arcuate slot. A mirror spring 4 is provided to supply torque urging the mirror toward its picture-composing position. In this position the mirror is oriented at 45° to the optical line of sight of the camera. Light impinging on the mirror is reflected up to a conventional ground-glass focusing screen (not shown) that is associated with the camera viewfinder (not shown).

A mirror actuating lever 5 is pivotally movable about an axis defined by a shaft 6. Hereinafter this axis and any axis parallel to it will for convenience be referred to as a horizontal axis. Similarly, any axis perpendicular to it will be referred to as a vertical axis. In FIG. 1 the mirror actuating lever 5 is illustrated in its picture-composing position whereas in FIG. 3 it is illustrated in its picture-taking position. As it moves between these positions at the beginning of a picture-taking operation, it pushes the mirror actuating pin 3 up so as to force the mirror up out of the way of the film.

A dowel 7 is fixed to the mirror actuating lever 5. The dowel 7 provides for engaging a shutter release lever 8 which in turn provides for engaging a shutter engaging member 16 so as to disengage the shutter.

Figure 2:
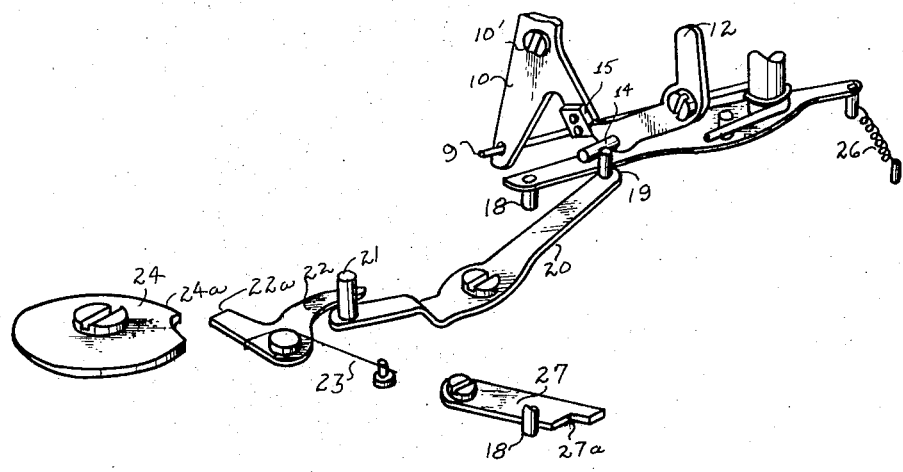
FIG. 2, further illustrative of the condition of FIG. 1, partially exploded, is a perspective view of the lower part of the mirror box and a portion of the winding mechanism.

A driving lever 10 is pivotally movable from and back to a starting position about a horizontal axis defined by a shaft 10' (FIG. 2). In FIGS. 1 and 2 the driving lever 10 is shown in its starting position. A torsion spring 9 provides torque biasing the driving lever toward clockwise rotation (i.e., back toward the starting position). Attached to one arm portion of the driving lever 10 there is a roller 10a (FIG. 3) that engages the mirror actuating member 5. Attached to another arm portion there is a roller 10b that engages a diaphragm actuating member 11.

The diaphragm actuating member has an end portion 11a, which, in conventional manner, acts on an automatic diaphragm linking member of the lens barrel (not shown). While the diaphragm actuating member is in its picture-composing position (i.e., as in FIG. 1), the lens diaphragm is kept fully open so as to allow the maximum amount of light in and thereby provide the brightest possible viewfinder image. A diaphragm holding spring 13 is connected between the diaphragm actuating lever and the driving lever 10.

A charging lever 17 is pivotally movable about a vertical axis. A coil return spring 26 provides for biasing the charging lever toward clockwise rotation.

A multi-position lever 12 is pivotally movable about a horizontal axis. A spring 25 provides for biasing the multi-position lever 12 toward clockwise rotation.

In preparation for the taking of a picture the film winding mechanism is operated. A cam 24 constitutes a part of the winding mechanism and is so arranged that it completes one whole revolution in connection with each complete operation.

A shutter release button (not shown) is depressed to trigger a sequence of operations leading to the exposure of the film. when the shutter button is depressed, the multi-position lever 12 is forced thereby to rotate in a counter-clockwise direction. The multi-position lever thus moves from its picture-composing position to its picture-taking position. The multi-position lever 12 has means comprising its end part 12a for releasably engaging the driving member 10 while the multi-position member is in its picture-composing position. This releasble engagement is made between end part 12a and one surface of a member 15 that is fixed to the driving member 10. This provides a stop preventing movement of the driving member 10.

As the multi-position member is forced away from its picture-composing position, end part 12a disengages from engaging member 15. Thus, driving member 10 is no longer stopped and swings counter-clockwise. As driving member 10 swings counter-clockwise, its arm 10a forces mirror actuating lever 5 to rotate clockwise, and its arm 10b forces diaphragm actuating member 11 to rotate counter-clockwise. Accordingly, the mirror 2 is pivoted up out of the way of the film into the position illustrated in FIG. 3. Also, the diaphragm is adjusted to the desired setting for picture taking.

As the mirror actuating member moves, owing to the action of the dowel 7, the shutter release lever is forced to pivot in counter-clockwise direction. Accordingly, it comes into contact with the shutter engaging member 16, thereby opening the shutter. (That is, the leading screen of the shutter starts to run.)

Figure 3:
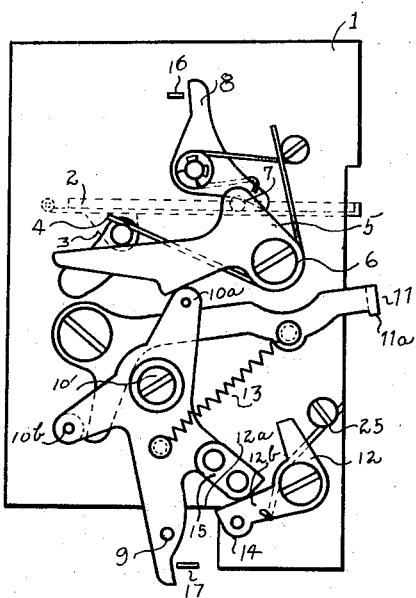
FIGS. 3 and 4 are views corresponding respectively to FIGS. 1 and 2 and each illustrates a picture taking condition.

At this time, the engaging member 15 comes into retaining engagement with the multi-position lever 12, as shown in FIG. 3. The configuration of these members is such that, with the engaging member 15 in the picture-taking position, an elongated surface 15a thereof comes into contact with the part 12b of the multi-position lever 12.

Figure 4:
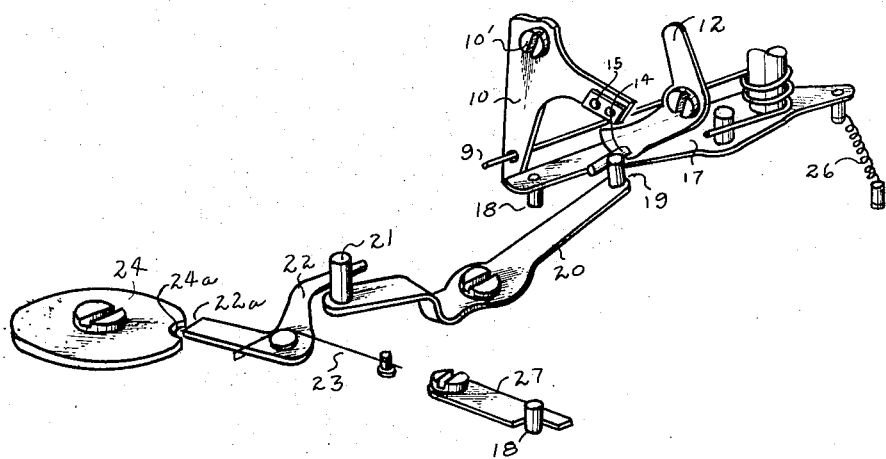

Throughout the picture-taking operation, the charging lever 17 is prevented from moving in accordance with the bias force provided by the return spring 26. This is prevented by a lever 27 (FIGS. 2 and 4). For convenience of viewing, the lever 27 is shown in exploded fashion amd a pin 18 with which it co-operates is shown twice. The pin 18 is fixed on one end of the charging lever 17. So long as the lever 27 is in the position shown in FIG. 1, it and the pin 18 prevent the charging lever 17 from moving in accordance with the bias force.

At the end of the picture taking operation, the lagging screen of the shutter completes its run, thereby closing the shutter. At this time, the lever 27 is forced to rotate in a counter-clockwise direction. It thus moves away from the pin 18 and the charging lever 17 is free to swing clockwise under the biasing of the return spring 26. This returning movement of the charging lever 17 forces the driving lever 10 to rotate clockwise so as to return to its picture-composing position. The multi-position, and the elongated surface 15a slides past the point at which it retains the multi-position lever 12 lever 12, no longer being retained by the driving lever 10, then rotates back to its picture-composing position under the biasing of the spring 25. At the same time, owing to the action of related springs, the follower members which are driven in response to the driving member are returned to their positions as shown in FIG. 1. These follower members are the mirror 2, the mirror actuating lever 5, the shutter release lever 8, the shutter engaging member 16, and the diaphragm actuating lever 11. When the driving lever 10 has returned completely, the multi-position lever 12 swings in a clockwise direction, owing to the action of the spring 25, into a position which enables it to engage the driving lever 10. Then, the winding-up engaging lever 22 swings in a clockwise direction owing to the action of the spring 23 so that the end part 22a is disengaged from the part 24a of the cam 24. As a result, winding-up action becomes possible.

The combination of this invention further includes means for interlocking the film winding mechanism. As best seen in FIGS. 2 and 3, an intermediate lever 20 is provided as a part of a linkage mechanism. The intermediate lever 20 has a pin 19 fixed to it at one of its ends for engaging a pin 14 on the multi-position member 12. At the other end of the intermediate lever 20 there is a pin 21 which engages a winding-up engaging lever 22. A spring 23 biases the winding-up engaging lever so that it contacts the pin 21. An end 22a of the winding-up engaging lever 22 and a part 24a of the cam 24 co-operate for selective stopping of rotation of the cam.

For the condition shown in FIG. 2, the parts 22a and 24a are disengaged and rotation of the cam 24 is not stopped. During the picture-taking operation, as shown in FIG. 4, the parts 22a and 24a are engaged. This occurs because of the linkage action provided by the levers 20 and 22 in response to the multi-position lever 12 being in its picture-taking position. After the shutter closes and the multi-position lever 12 returns to its picture-composing position as described above, the spring 23 drives the lever 22 and, indirectly, the lever 20 to return.

From the foregoing, it will be appreciated that the combination of this invention has the following significant advantage. The winding-up action preventing/permitting means is related to the multi-position lever 12. This lever, in turn, owing to the action of shutter closing responsive means including the lever 27, operates in a cycle. In the course of the cycle, with the multi-position lever 12 in its picture-taking position, it is impossible to wind-up inadvertently.

What is claimed is:

1. In a single lens reflex camera having a shutter mechanism, a film winding mechanism that prior to triggering of a picture-taking operation in which the shutter mechanism is opened and closed provides for advancing film into position to be exposed, a mirror actuating member, and a diaphragm actuating member with each actuating member being movable between picture-composing and picture-taking positions, the combination comprising:

means for moving the actuating members through said positions in a cycle in the course of the picture-taking operation, said means including a driving member having a starting position at which prior to said triggering it is releasably stopped from moving and from which thereafter it is movable in a first direction to drive the actuating members from their picture-composing positions to their picture-taking positions, the driving member being movable in a second, opposite direction so as to return to the starting position upon completion of the return of the actuating members to their picture-composing positions;

a multi-position member movable from first to second positions when the shutter mechanism is triggered, and biasing means acting against the multi-position member for urging it to return to the first position;

means on the multi-position member for releasably engaging the driving member while the multi-position member is in the first position so as to stop the driving member from moving until said triggering;

means on the driving member for releasably engaging the multi-position member while the multi-position member is in the second position so as to retain it there throughout the time the driving member is moving in the second direction and to release it upon completion of said return of the actuating members; and means connected to the multi-position member for interlocking the film winding mechanism while the multi-position member is in the second position so that the film cannot be advanced until the completion of said return of the actuating members permits the multi-position member to be released and thereby be urged to return to the first position.

2. The combination of claim 1 wherein the film winding mechanism includes a cam and the interlocking means includes a pivotably movable member cooperating with the cam to form a stop.

3. The combination of claim 2 wherein the interlocking means includes a linkage for connecting the multi-position member to the cam and spring means for urging the linkage in a predetermined direction.

4. The combination of claim 1 wherein the driving member comprises a pivotally movable lever having separate arms for acting against the actuating members, and wherein said means on the driving member comprises an elongated surface that slides against the multi-position member while the driving member is moving in the second direction.

5. The combination of claim 4 wherein the multi-position member comprises a pivotally movable lever and wherein said means on the multi-position member is defined by an arm thereof.

* * * * *